US012592995B2

(12) United States Patent
Phinn

(10) Patent No.: US 12,592,995 B2
(45) **Date of Patent: *Mar. 31, 2026**

(54) SYSTEM FOR CONTROLLING AND SCREENING INCOMING CALLS

(71) Applicant: Griff and Associates, L.P., Fallsington, PA (US)

(72) Inventor: Alex J. Phinn, Fallsington, PA (US)

(73) Assignee: GRIFF AND ASSOCIATES, L.P., Fallsington, PA (US)

( * ) Notice: Subject to any disclaimer, the term of this patent is extended or adjusted under 35 U.S.C. 154(b) by 297 days.

This patent is subject to a terminal disclaimer.

(21) Appl. No.: 18/473,212

(22) Filed: Sep. 23, 2023

(65) Prior Publication Data

US 2024/0015247 A1     Jan. 11, 2024

Related U.S. Application Data

(63) Continuation of application No. 17/491,712, filed on Oct. 1, 2021, now Pat. No. 11,800,010.

(60) Provisional application No. 63/086,873, filed on Oct. 2, 2020.

(51) Int. Cl.
| | |
|---|---|
| *H04M 3/436* | (2006.01) |
| *G06F 18/22* | (2023.01) |
| *H04M 3/42* | (2006.01) |
| *H04M 3/54* | (2006.01) |

(52) U.S. Cl.
CPC ............ *H04M 3/436* (2013.01); *G06F 18/22* (2023.01); *H04M 3/42195* (2013.01); *H04M 3/54* (2013.01)

(58) Field of Classification Search
CPC .... H04M 3/436; H04M 3/42195; H04M 3/54; H04M 3/02; H04M 3/42059; G06F 18/22
See application file for complete search history.

(56) References Cited

U.S. PATENT DOCUMENTS

| | | | | |
|---|---|---|---|---|
| 4,310,722 | A | 1/1982 | Schaible | |
| 8,548,444 | B2 * | 10/2013 | Channakeshava | ...... H04W 4/16 |
| | | | | 455/414.3 |
| 9,241,245 | B2 * | 1/2016 | Lou ........................ | H04W 12/08 |
| 11,496,899 | B1 * | 11/2022 | Koster .................. | H04M 3/436 |
| 2009/0325615 | A1 * | 12/2009 | McKay ................... | H04W 4/14 |
| | | | | 455/466 |
| 2018/0020093 | A1 | 1/2018 | Bentitou | |
| 2021/0099578 | A1 | 4/2021 | Caseau | |
| 2021/0136197 | A1 * | 5/2021 | Clay ................. | H04M 3/42059 |

\* cited by examiner

*Primary Examiner* — Benjamin M Thieu
(74) *Attorney, Agent, or Firm* — Sand, Sebolt & Wernow Co., LPA

(57)     ABSTRACT

A system for screening and routing incoming phone calls or text messages that includes an interceptor device which is operatively engaged with the phone and is arranged to receive all incoming calls or texts to the phone. When an incoming call or text to the phone is received by the interceptor device, programming provided in the interceptor device compares a phone number associated with the incoming call or text with a list of stored contact phone numbers. The incoming phone call may be disconnected if the phone number associated with originating the incoming call or text fails to match any of the stored contact phone numbers. The incoming call or text is routed to a known or designated contact from the stored contact phone numbers for approval.

20 Claims, 5 Drawing Sheets

SYSTEM FOR CONTROLLING AND SCREENING INCOMING CALLS

CROSS REFERENCE TO RELATED APPLICATIONS

This disclosure is a continuation of U.S. patent application Ser. No. 17/491,712, filed on Oct. 1, 2021, which claims priority to U.S. Provisional Patent Application Ser. No. 63/086,873, filed Oct. 2, 2020, the entirety of each of which is incorporated herein by reference.

TECHNICAL FIELD

This disclosure relates generally to phone systems and methods. More particularly this disclosure relates to a system and method for monitoring and controlling incoming phone calls to a particular phone number. The system includes an interceptor device that receives all incoming calls. Programming in the interceptor device compares the phone number associated with the incoming call to a list of stored contact phone numbers. Only those incoming calls which are associated with known contact phone numbers will be allowed through to the phone. Calls that are unknown may be redirected to a third party device or purposefully disconnected.

BACKGROUND

One of the biggest issues surrounding home phones and cell phones is the problem of unsolicited phone calls. In recent years, telemarketers have utilized computer programs to systematically call long lists of phone numbers and if some unsuspecting person answers the phone, the phone call is patched through to a salesperson whose job it is to then try to sell a product or service to the person who answered the phone. In order to get people to unsuspectingly answer their phone, many telemarketing calls are made in those hours shortly after a typical workday has ended, or on weekends, or at hours of the day when people are least on their guard.

While many legitimate companies use telemarketing to increase or obtain sales, there is an ever-growing number of companies and persons that use telemarketing-type tactics to scam individuals and separate them from their money. Recently, there have been a rash of calls from people pretending to be representatives of government tax-collecting agencies who scare people into thinking they are speaking to government officials and therefore pay over money that they supposedly owe the government. At particular risk are law-abiding senior citizens who do not want to fall afoul of the government. Other people may fall victim to fraudulent charity calls or phone calls from phony home repair and renovations companies.

As a result, most people consider telemarketing-type calls to simply be nuisance phone calls that they would rather avoid. It is quite common for people to not answer their phone if they don't recognize the phone number from which an incoming call originates. Even if a person does not answer their phone, simply having received the phone call tends to disturb the time people could be spending with family or resting and relaxing.

SUMMARY

The present disclosure is directed to a system and method for screen incoming phone calls in the hopes of avoiding nuisance calls. The disclosed system and method puts the user of a phone back in control of which incoming phone calls they are will to receive. Particularly, the present disclosure provides a system that is specifically implemented to protect law-abiding senior citizens from these telemarketers. Namely, senior citizens typically have adult-aged children who are more tacitly aware of these scam tactics. The disclosed system can utilize an interceptor device to route the unknown call away from the senior citizen to a third party device, such as an adult-aged child who can receive the call on behalf of the intended recipient (i.e., senior citizen). The adult-aged child may answer the call (or return the call if a message is left) to determine whether the call was telemarketing spam/non-important call, or the adult-aged child may determine that the call is of actual importance needing a subsequent action to be performed.

A system for screening incoming phone calls is disclosed herein that includes an interceptor device. The interceptor device is operatively engaged with the phone and is arranged to receive all incoming calls to the phone. When an incoming call to the phone is received by the interceptor device, programming provided in the interceptor device (or the phone) compares a phone number associated with the incoming call with a list of stored contact phone numbers. (The contact list may be stored in a memory of the phone or in a memory of the interceptor device.) The phone is caused to ring if the phone number associated with originating the incoming call matches one of the stored contact phone numbers. In one embodiment, the incoming phone call may be disconnected if the phone number associated with originating the incoming call fails to match any of the stored contact phone numbers. In other words, the phone number associated with the incoming call does not appear in the stored contact phone number list. Additional embodiments provide for automatic routing of the call from the unknown contact to a third party device, wherein the third party device enables an operator to determine whether to answer the unknown call. If answered by the third party device, the operator thereof may make the determination of whether the contents of the call are legitimate.

In one aspect, an exemplary embodiment of the present disclosure may provide a system for screening incoming phone calls comprising a phone having a phone number; an interceptor device operatively engaged with the phone, wherein the interceptor device receives all incoming phone calls directed to the phone number; and programming provided in the interceptor device that determines if a particular incoming call has been made from a contact stored in a memory of the phone or in a memory of the interceptor device.

In one aspect, an exemplary embodiment of the present disclosure may provide a method if screening incoming phone calls comprising providing an interceptor device that is operatively engaged with a phone; receiving, with the interceptor device, an incoming call to a phone number associated with the phone; comparing, with programming provided in the interceptor device, a phone number associated with originating the incoming call with a list of stored contact phone numbers; and performing one of allowing the phone to ring if the phone number associated with originating the incoming call matches a stored contact phone number from the list of stored contact phone numbers; and disconnecting the incoming call if the phone number associated with originating the incoming call fails to match any stored contact phone number from the list of the stored contact phone numbers. Alternative or in addition to disconnecting the incoming call to the phone, the method may automatically route or direct the incoming call to a third party device or third party phone. The operator of the third party device may decide whether the incoming call is legitimate on behalf of the original phone owner, who may be a senior citizen. Stated otherwise, an adult-aged child may automatically receive the phone calls from unknown numbers that are called to their senior citizen parent's phone. The adult-aged child is therefore enabled to determine whether the call is legitimate so their senior citizen parent does not become a victim of a telemarketing scam.

In one embodiment the method may further include downloading a software application into the phone. In one embodiment the method may further include entering a plurality of contact phone numbers in the phone to form the list of stored contact phone numbers; and linking the list of stored contact phone numbers with the software application. This embodiment may also provide for the downloading of the app in both the senior citizen's phone as well as downloading the app in the adult-aged child's phone. The two apps may be networked-linked with each other to allow for the sharing of contacts between the two apps.

In one embodiment, the method may further provide storing a phone number of a designated contact in the interceptor device; and forwarding the incoming call to the phone number of the designated contact if the phone number associated with originating the incoming call fails to match any phone number in the list of stored contact phone numbers. In one embodiment, the method may further provide that the designated contact answers the incoming call; and talks to a person who made the incoming call. In one embodiment, the method may further provide that the designated contact answers the incoming call; and forwards the incoming call to the interceptor device; and wherein the interceptor device forwards the incoming phone call to the phone which is then allowed to ring. In one embodiment, the method may further provide entering the phone number associated with the incoming call into the stored list of contact phone numbers.

In an alternative embodiment, that keeps with the present disclosure intent to protect senior citizens, the primary interceptor device may be in operative communication with or be a mobile application operating on a primary phone operated by an adult-aged child of the senior citizen. The interceptor device may be associated with a phone number of the senior citizen parent. Thus, all calls intended for the senior citizen parent are immediately directed to the interceptor device on the adult-aged child's phone. If the incoming call is known, then the interceptor may automatically direct the call from the primary phone operated by the adult-aged child to the senior citizen parent's phone, which in this case would be the third party device or phone. This would allow only the known phone numbers to be sent to the senior citizen parent to ensure they are not becoming the target of a telemarketing scam. The primary phone of the adult-aged child that is operating the interceptor device

BRIEF DESCRIPTION OF THE SEVERAL
VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
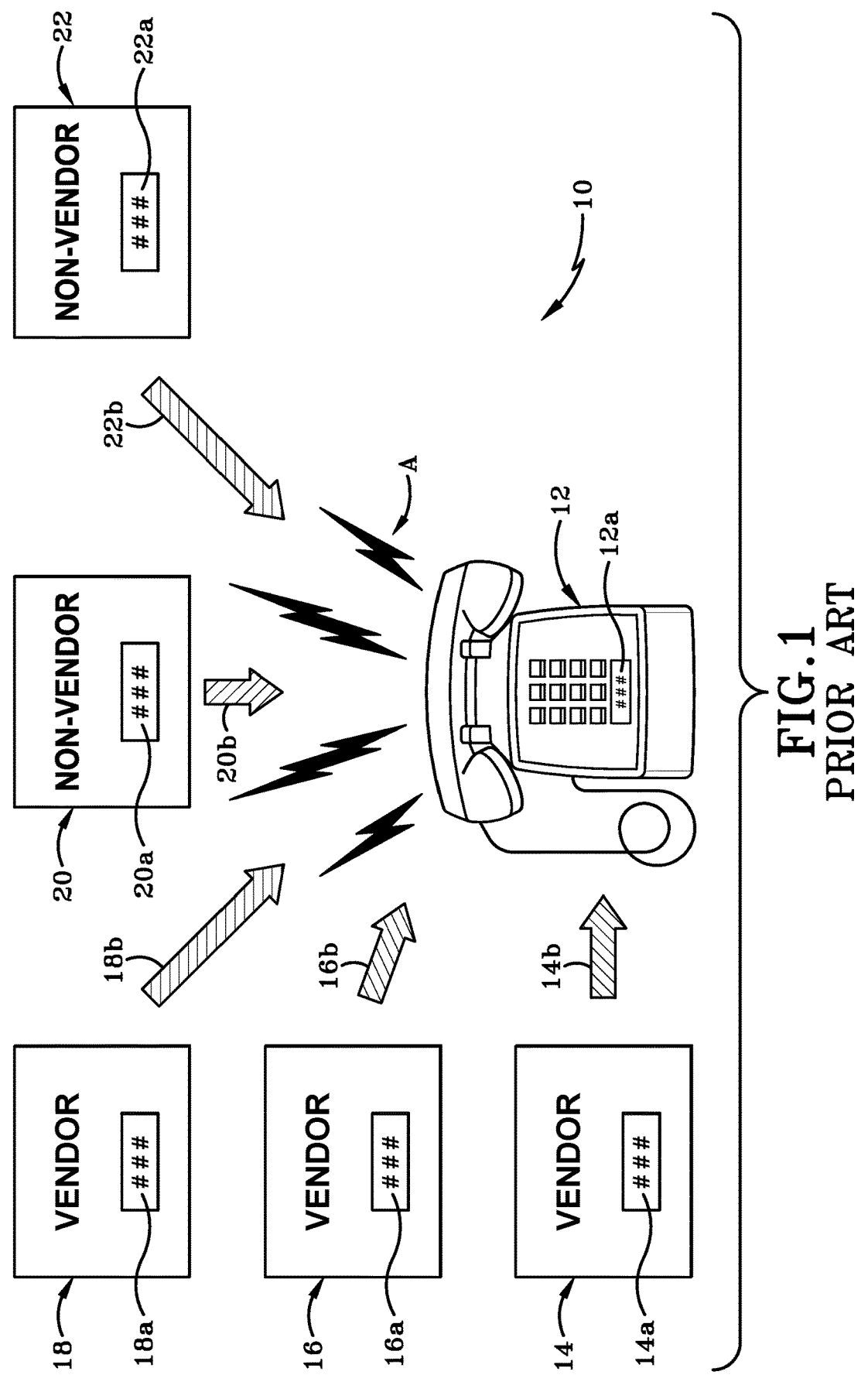
FIG. 1 is a diagrammatic view of a PRIOR ART phone system and method.

FIG. 1 shows a diagrammatic view of a PRIOR ART phone system 10 that includes a phone 12 having a dedicated phone number 12a that is specific to only that phone 12. FIG. 1 illustrates a push-button type phone 12 but it will be understood that phone 12 is meant to represent any type of phone that can receive any type of phone call from another phone number. Phone 12 is operatively engaged with a plurality of other phones and/or electronic devices in any one of a number of different ways. For example, phone 12 may be operatively engaged with other phones or electronic devices through phone lines, through wireless electronic networks, via satellite, or through the Internet. The terms "phone" and "electronic device" may be used interchangeably herein.

FIG. 1 illustrates five phones or electronic devices that are representative of any devices with which phone 12 may be operatively engaged. In particular, FIG. 1 shows a first phone 14 that is associated with a first phone number 14a, a second phone 16 that is associated with a second phone number 16a, a third phone 18 that is associated with a third phone number 18a, a fourth phone 20 that is associated with a fourth phone number 20a, and a fifth phone 22 that is associated with a fifth phone number 22a. By way of example only, first phone 14, second phone 16, and third phone 18 are phones and phone numbers 14a, 16a, 18a that belong to vendors. The term vendor is being utilized to represent any merchant or organization that may have a product or service to sell or that purports to have a product or service to sell. The term vendor is further being utilized to represent any organization raising funds for both legitimate and non-legitimate organizations and charities. Fourth phone 20 and fifth phone 22 are representative of phones and phone numbers that belong to non-vendors such as family members, friends, and or associates with whom the owner of the phone 12 has dealings.

It will of course be understood that there are potentially thousands of vendors and a plurality of non-vendors who might contact the user of the phone 12 either directly by calling the number 12 personally, or through use of a computerizing calling system or an Internet-based calling system.

FIG. 1 illustrates that each of the five phones 14-22 is capable of calling phone 12 and potentially being connected thereto when the user answers the phone 12. In particular, a call 14b may be made from first phone 14 to phone 12; a call 16b may be made from second phone 16 to phone 12; a call 18b may be made from third phone 18 to phone 12; a call 20b may be made from fourth phone 20 to phone 12; and a call 22b may be made from fifth phone 14 to phone 12. The calls 14b-22b may be solicited calls or unsolicited calls. A solicited call, for example, may be a call from a vendor or non-vendor that the user of the phone 12 knows or has had previous contact with or would be happy to know and have future contact with, and may therefore be considered to be desired or wanted call. An unsolicited call, for example, may be a call from a vendor or non-vendor that the user does not know or does know but does not want to hear from. The unsolicited call may therefore be considered as an undesirable or unwanted call.

When a person or computerized calling system or Internet-based calling system places a call 14b-22b to phone 12 from one of the phones 14-22, and the phone 12 rings, as indicated by the reference character "A" in FIG. 1, the user (i.e., "owner" of the phone 12) has to make a decision as to whether or not to answer the call "A". In FIG. 1, by way of example only, the user of the phone 12 may be happy enough to answer a phone call 16b from the second vendor 16 and/or a phone call 20b from the first non-vendor 20. The user of the phone 12 may not want to receive a call 14b from the first vendor 14, or a call 18b from the third vendor 18, or a call 22b from the second non-vendor 22.

When the phone 12 rings "A", the user has to rely on caller ID, call display or name display, or has to simply pick up the phone 12 and answer it in order to find out who is calling them. Caller ID, i.e. caller identification, is a service offered by most phone companies which will display the phone number of the vendor or non-vendor from which the phone call originated. However, caller ID, call display, or name display is only useful if the user of the phone 12 recognizes the phone number or name that is displayed. Other than personally recognizing the phone number 14a-22a or the name that is displayed, there is no way for the user of the phone 12 to know who is calling them other than by picking up the phone or letting the call go to voice mail. This PRIOR ART system 10 leaves the user of the phone 12 at risk of missing calls they would have been happy to receive or of being harassed, receiving calls at unwanted hours and/or pressurized sales tactics.

One additional issue of the PRIOR ART system 10, particularly when computerized calling systems are used is that disreputable firms, organizations, or persons may mask their real phone number or identify. Any caller ID, call display, or name display may be programmed by dishonest parties to display a false or fictitious name or phone number. The user of the phone 12 may therefore be misled into answering the call "A".

Figure 2:
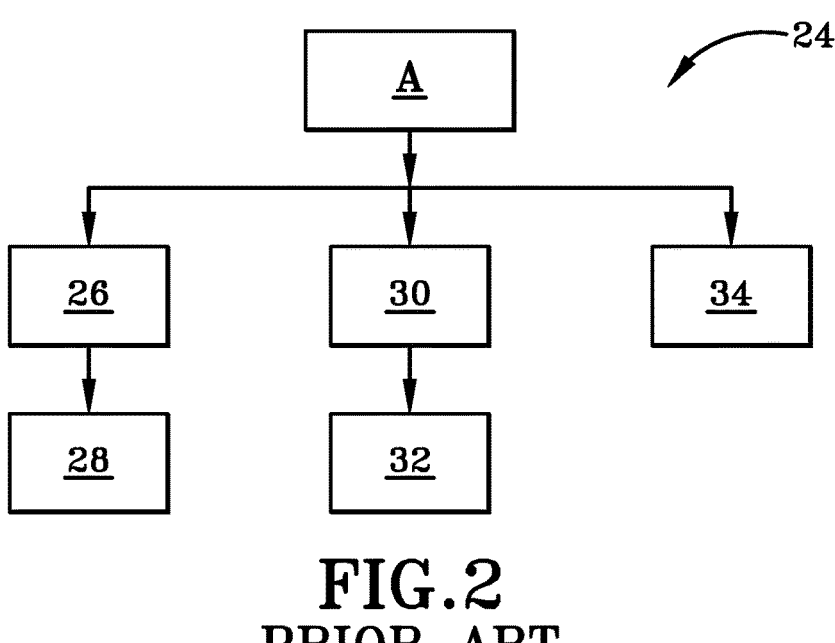
FIG. 2 is a flowchart depicting a method of using the PRIOR ART phone system, where the phone does not include a stored list of contacts.

FIG. 2 illustrates a flowchart showing a possible method of use 24 of the PRIOR ART system 10. The figure shows a plurality of different courses of action that may be undertaken by the user of the phone 12 when a call "A" is received. In a first course of action, the user may answer the phone 26 and then find out who is calling 28. In a second course of action, the user may let the incoming call go to voice mail 30 so that the caller can leave the user a voice message. The user may then retrieve their voice mail 32 and find out who called them. In a third possible course of action, if the user of the phone 12 does not have voice mail, the user may simply ignore or decline the call 34.

If the phone 12 is a smartphone or another electronic device that is capable of receiving calls, the user may be able to store an electronic list of contacts so that they have a list of phone numbers handy for use. When a call comes in from one of those contacts, the name of the contact is displayed on a user interface of the phone 12. It is therefore relatively easy for the user to see who is calling them. The problem, however, still arises with people and organizations who are not stored in the list of contacts. In this instance, the smartphone will simply display "unknown" on the user interface and the user of the phone 12 again has to make the decision whether or not to answer the call, let it go to voice mail, or to decline the call.

Figure 3:
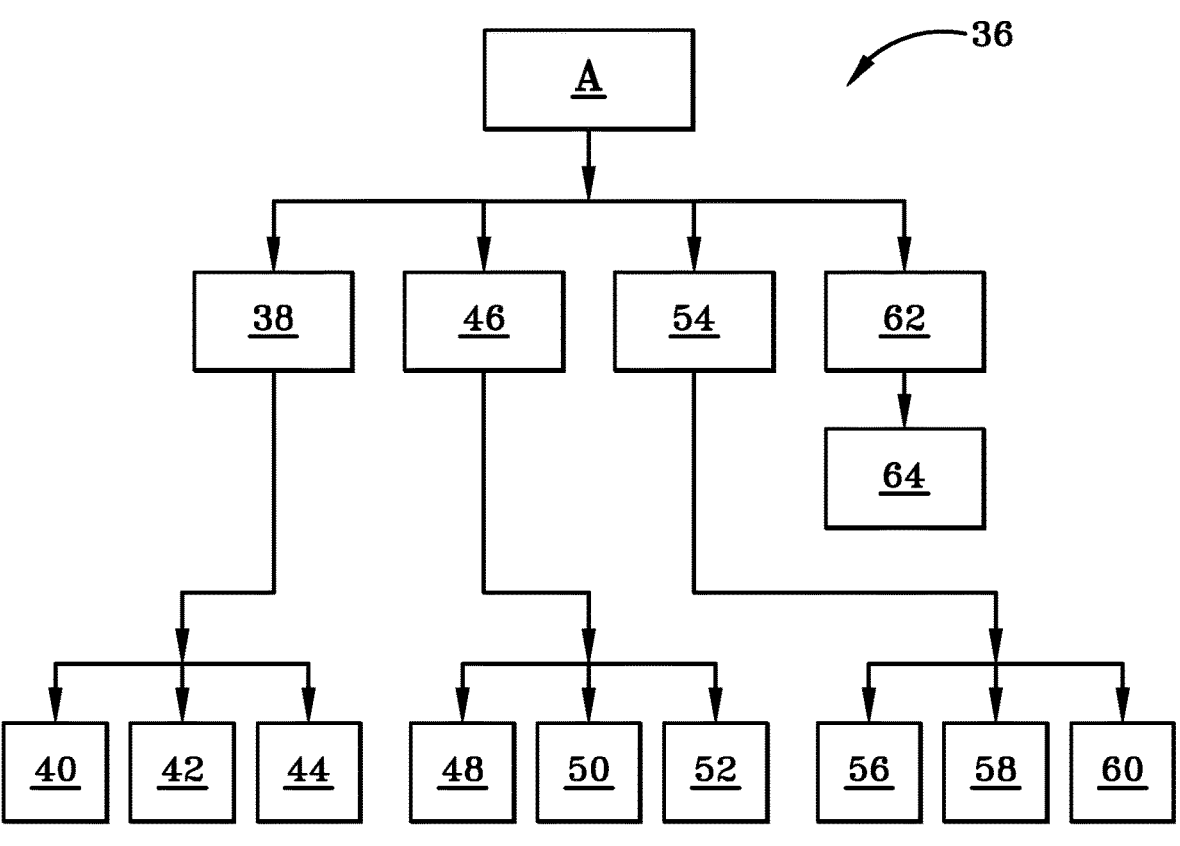
FIG. 3 is a flowchart depicting a method of using the PRIOR ART phone system, where the phone does not include a stored list of contacts.

FIG. 3 illustrates a flowchart showing a possible method of use 36 of the PRIOR ART system 10 when the phone is a smartphone or other electronic device having a stored list of contacts therein. When the phone rings "A", the user interface displays a contact name and/or contact number 38 from the list of stored contacts. The user then has the option, upon seeing the display on the user interface, to answer the call 40, allow the call to go to voice mail 42, or decline the call 44. In a second course of action, when the phone rings "A", the user interface may display the word "unknown" 46 or something similar to this word. This indicates that the call is coming from a number that is not stored in the list of contacts. The user then has the option upon seeing the display on the user interface to answer the call 48, allow the call to go to voice mail 50, or decline the call 52.

In a second course of action, when the phone rings "A", the user interface may display the word "unknown" 46 or something similar to this word. This indicates that the call is coming from a number that is not stored in the list of contacts. The user then has the option upon seeing the display on the user interface to answer the call 48, allow the call to go to voice mail 50, or decline the call 52.

FIG. 3 also illustrates an instance where the phone 12 displays a name or number on the user interface 54 that is not stored in the list of contacts on the phone but has been programmed by other persons in such a way that the phone will not display the word "unknown" when the phone rings. This display is suggestive to the user of the phone 12 that they know the person or organization who initiated the call "A". The user then has the option upon seeing the display on the user interface to answer the call 56, allow the call to go to voice mail 58, or decline the call 60.

FIG. 3 shows an additional course of action where the user has previously physically placed a block 62 on a specific phone number stored in their list of contacts. In this instance, when the vendor or non-vendor places the call to phone 12, instead of ringing, the call is sent straight to voice mail 64.

In all of the actions listed above, the incoming call disturbs the user of the phone 12 in that the phone will ring "A" or, with respect to blocked calls, a voice mail notification (typically a sound) indicates to the user that a voice message has been left on the phone.

Figure 4:
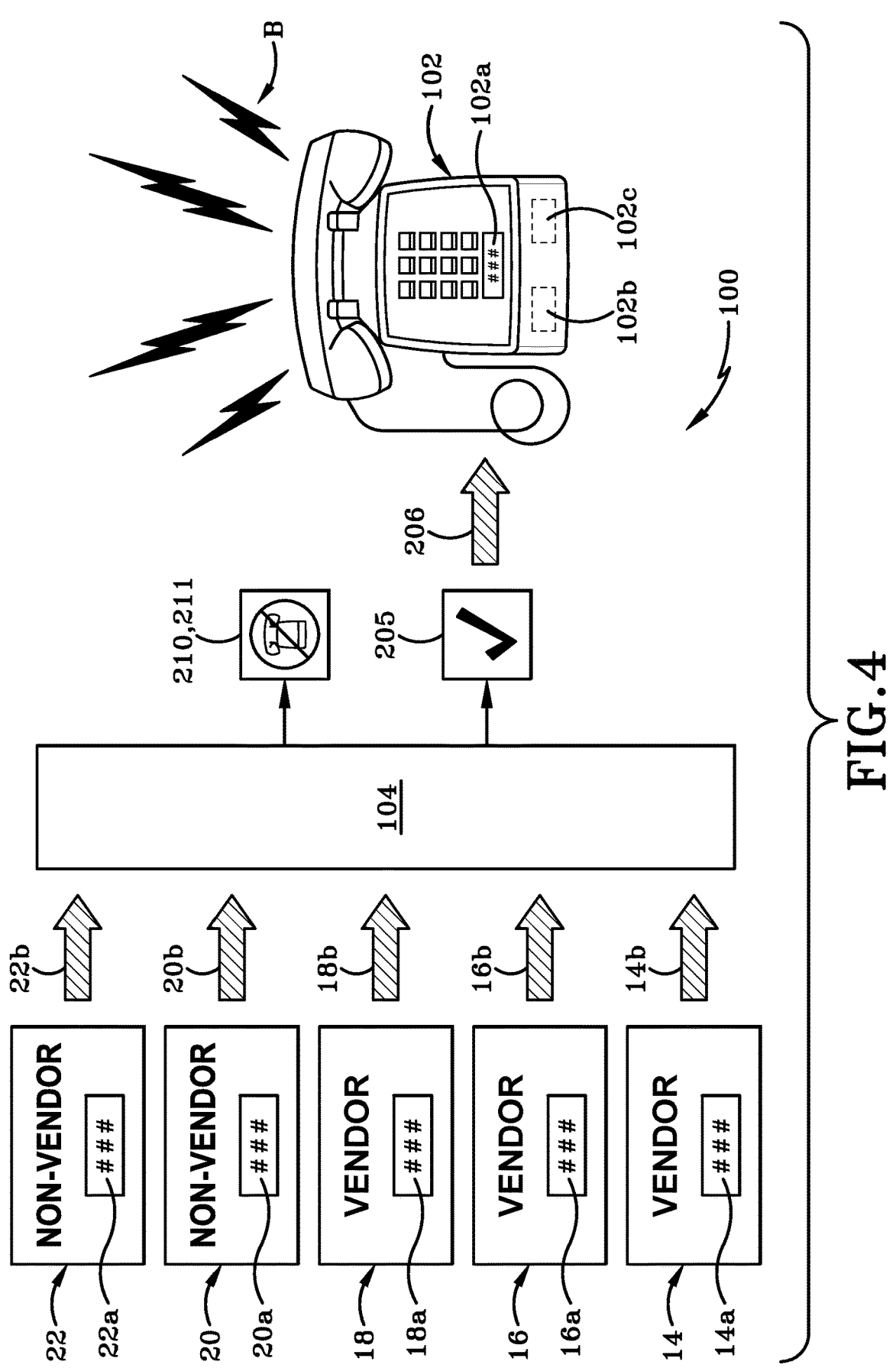
FIG. 4 is a diagrammatic view of a phone system in accordance with the present disclosure.

FIG. 4 is a diagrammatic view of a phone system in accordance with the present disclosure, generally indicated at 100. System 100 includes a phone 102 that has a dedicated phone number 102a. Phone system 100 includes the same first vendor 14 having a first phone number 14a that is capable of connecting 14b to phone 102. System 100 further includes second vendor 16 having a second phone number 16a that is capable of connecting 16b to phone 102. Phone system 100 includes third vendor 18 having a first phone number 18*a* that is capable of connecting 18*b* to phone 102. System 100 further includes a first non-vendor 20 having a fourth phone number 20*a* that is capable of connecting 20*b* to phone 102. System 100 further includes a second non-vendor 22 having a fifth phone number 22*a* that is capable of connecting 22*b* to phone 102. The vendors and non-vendors 14-22 are the same as described previously herein.

Phone 102 is substantially identical to phone 12. System 100 is different from PRIOR ART system 10 in that system 100 includes an interceptor device 104 that is operatively positioned between phone 102 and the various vendors and non-vendors 14-22. In one embodiment, the interceptor device 104 is a physical device having its own processor and memory that is operatively engaged with the phone 102 in such a way that incoming phone calls are routed through interceptor device 104 before phone 102. In another embodiment, the interceptor device 104 is a software application (i.e., hereafter APP 104), i.e., software that performs a specific task of intercepting incoming phone calls to phone 102. The APP 104 may be installed on the phone 102 when the phone is a smart cell phone or smartphone. The APP 104 in some embodiments is software that is downloaded to a processor 102*b* provided in phone 102. The processor 102*b* is operatively engaged with or includes a memory 102*c*. Interceptor device 104 may also be embodied as interceptor logic that wholly controls the APP 104. When the interceptor device 104 is embodied as APP 104 or interceptor logic, it may include a specific order of operations, or an ordered combination of actions, that are specifically designed to overcome the network-specific problem of screening calls from vendors that are not desirable to the user of phone 102. Interceptor device 104, APP 104, or interceptor logic is directed to an improved device, which can be embodied in a method that is designed to screen unwanted or unwarranted telephone calls as described in greater detail herein. The Interceptor device 104, APP 104, or interceptor logic did not have analog equivalents and provides improved manners of networked communications that solves the previously described network-centric problems of receiving unwanted calls that persists in conventional landline telephones and wireless cell phones, regardless of type of connection, such as wireless cell coverage, voice-over internet protocol (VOIP), or landlines. The teachings discussed herein are directed to specific examples of implementing the Interceptor device 104, APP 104, or interceptor logic, not necessarily the broad concept of screening telephone calls. Particularly, he Interceptor device 104, APP 104, or interceptor logic that can be implemented via a method are herein detailed in the following manners that provide specific elements that are improvements over prior art systems to provide advances in the art. For example, with respect to the interceptor device 104, APP 104, or interceptor logic, these configurations detailed herein eliminate the need for a user to determine whether to accept an unsolicited call and preemptively eliminates the unwanted call from ever making it to the user. Thus, the Interceptor device 104, APP 104, or interceptor logic enables the telephone to remain unbothered in a specific way. By doing so, and implementing the he Interceptor device 104, APP 104, or interceptor logic, the present disclosure is able to improve the functionality of the telephone, especially a cell phone. Particularly, cell phones have limited battery life that is deplenished/depleted when many unwanted calls are received. Thus, by implementing a smart cell phone (i.e., an iPhone or the like, having a battery, a touchscreen display, and associated memory and processor capable of executing mobile applications) with the Interceptor device 104, APP 104, or interceptor logic, the operation of the smart cell phone can be improved by increasing battery life by screening calls in the manner described herein by not causing the cellphone to ring or for the cell phone to implement network connectivity which drain the cell phones battery. Further, when APP 104 may be running in the background on the cellphone. This eliminates the need for the user to open a second screening application in addition to their telephone application on their smart cell phone. Thus, the Interceptor device 104, APP 104, or interceptor logic, as detailed herein, detail an unconventional arrangement of elements, because the prior art methodologies did not provide a single application to screen calls, or simply would not screen calls at all that would drain the battery of a mobile device or otherwise increase the processing burden on the device. As a combination, the mobile device having the Interceptor device 104, APP 104, or interceptor logic of the present disclosure is able to unconventionally provide a device that automatically detect, screen, and eliminate and unwanted or unsolicited call from a phone number unknown to the user without the need for a user to use multiple applications or separate devices, or provide additional human interaction. By adding these specific elements the Interceptor device 104, APP 104, or interceptor logic are an improved system, which can be embodied as a method, to screen and eliminate an incoming and unknown or unwanted phone call using automatic and background processing. Therefore, the specific teachings, as an ordered combination of specific elements discussed herein, represent technological improvements over the prior art.

The physical device and the APP 104 will perform substantially the same function as will be described with respect to the shown in FIG. 4 and the method 200 shown in FIG. 5. In a first step 201 of method 200, an interceptor device 104 is operatively engaged with the phone 102. In a second step 202, a list of contacts and associated phone numbers of those contacts is entered into the interceptor device 104 or is operatively linked with the interceptor device 104. In particular, if the interceptor device 104 is a physical device, the list of contacts and associated phone numbers may be physically entered into the device or the interceptor device 104 may include a processor and memory and may be paired with the phone 102 so that the contacts stored in the memory 102*c* of the phone 102 are uploaded into the interceptor device's memory. If the interceptor device 104 is an APP that is downloaded to phone 102, the APP 104 is electronically connected to the database stored in the memory 102*c* that includes the list of contacts and associated phone numbers.

In a third step 203 of the method 200, an incoming phone call to phone 102 is routed through and/or is received by interceptor device 104. In a fourth step 204 of the method 200, the phone number associated with the incoming phone call is compared with the phone numbers of the user's contacts stored in the phone's memory 102*c* or entered into the interceptor device 104. For example, if the incoming phone call originates from the phone number 16*a* associated with the second vendor 16, the programming within interceptor device 104 compares the phone number 16*a* with the list of phone numbers in the stored contact information.

Figure 5:
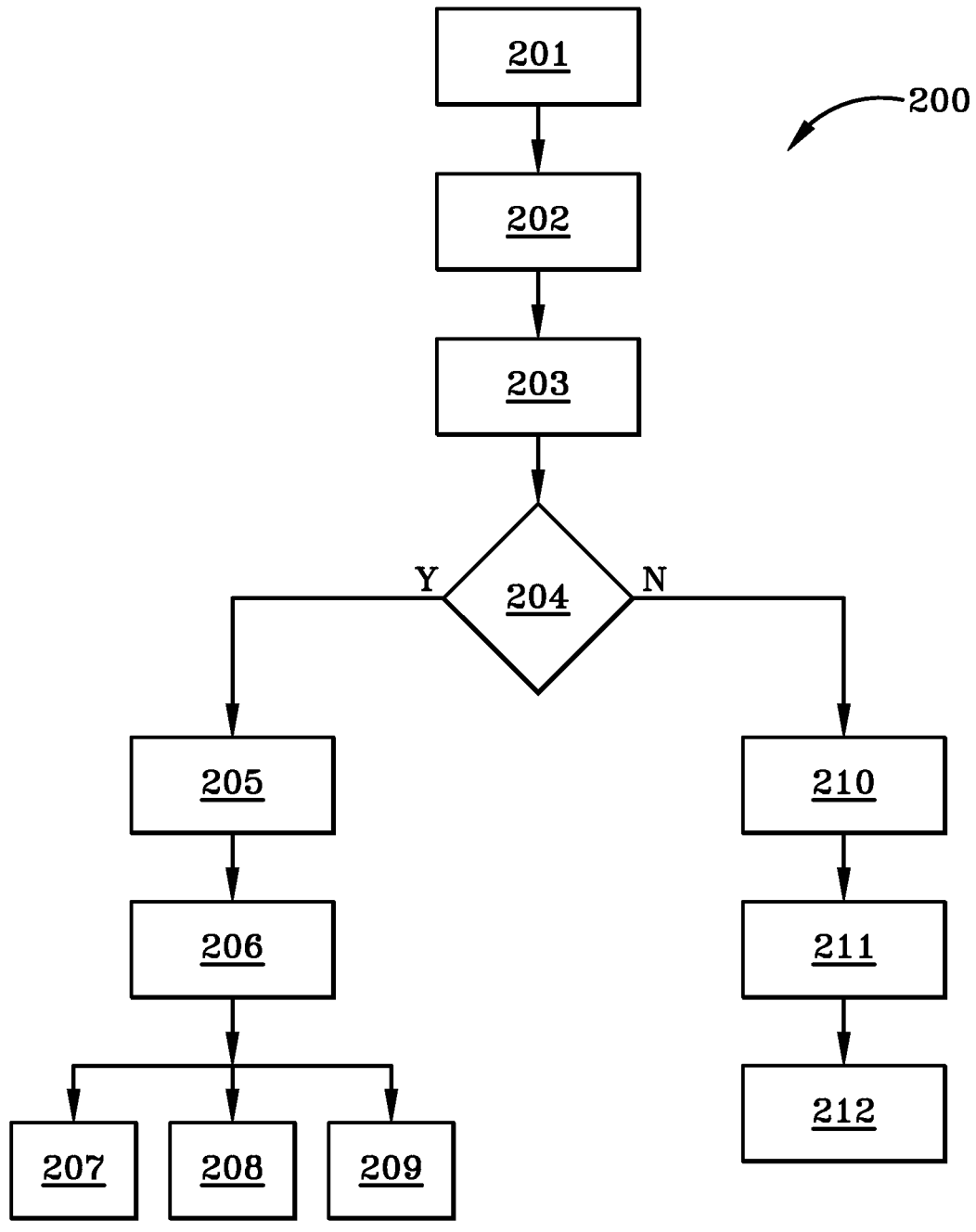
FIG. 5 is a flowchart illustrating a method of using the phone system of FIG. 4.

FIG. 5 shows two alternative pathways after the comparison is made in fourth step 204. In a first pathway 205, a match is made between the phone number associated with the incoming call and a stored contact. For example, the phone number 16*a* is found on the list of stored contact phone numbers. When the match is made 205, the interceptor device 104 permits the incoming phone call to be transferred 206 through to phone 102 and the phone 102 will ring "B" (FIG. 4). The pathway of matching the incoming phone number and enabling the phone to ring is indicated in FIG. 2 by the checkmark 205. Because the phone 102 rings, the user has three options available to him or her, i.e., answer the call 207, permit the call to go to voice mail 208, or decline the call 209.

FIG. 5 also shows the second pathway after the fourth step. In this second pathway 210, no match is made between the phone number associated with the incoming call and a stored contact. For example, the phone number 16*a* is not found on the list of stored contact phone numbers. If no match is made between the phone number of the incoming call and a stored phone number on the contact list then, in the next step 211, the interceptor device 104 does not permit the incoming phone call to transfer to the phone 102 and disconnects the incoming call. Because the interceptor device 104 does not permit the incoming phone call to transfer to the phone, the phone does not ring (i.e., blocks) and therefore the user of the phone is not disturbed by the phone ringing or optionally receiving a voice message. This second pathway is represented in FIG. 4 by the phone with a diagonal line passing through it. Subsequent to step 211, the interceptor device 104 may route the blocked call directly and automatically (i.e., without user input or intervention) to a third party phone or device, as indicated by step 212.

It should be noted that the second pathway differs substantially from the user programming their phone 102 to block a particular phone number on their stored contact list. If a phone number on the contact list is blocked and there is an incoming phone call from that blocked phone number, the incoming phone call is still received by the phone 102 but instead of causing the phone to ring, the incoming phone call is transferred automatically to voice mail or the phone will ring once and then the incoming call will be disconnected. In the method 200 disclosed herein, the incoming phone call is never transferred to the phone 102; there is no ringing of the phone 102 and there is no automatic transfer of the incoming phone call to voice mail. Instead, the incoming phone call never registers on the phone at all; to the user, it is as though the incoming phone call never happened. As a consequence, the only incoming phone calls that cause the phone 102 to ring or that are recorded as a voice message or a missed call are incoming phone calls from people and organizations stored in the user's contact list. By implementation of the disclosed method 200, the number of nuisance calls can be substantially reduced for a user.

Additionally, this consequence is beneficial as it may be part of step 212 that automatically routes the unknown call to the third party device. This is particularly useful when the operator of phone 102 is a senior citizen who is part of the at-risk population regularly subjected to telephone scams. Routing the unknown call automatically to a third party device, per step 212, such as an adult-aged child of the senior citizen operator of phone 102 allows the third party to selective receive the call and determine whether the information conveyed by the call is legitimate or a scam. For example, the senior citizen may receive a call at phone 102 from an unknown number, but in this example, the unknown number is a legitimate call, say from a doctor's office seeking to confirm an appointment. However, the senior citizen operator of the phone 102 did not have the doctor's office phone number saved in the phone or interceptor device 104. The interceptor device disconnects the call such that it does not ring at phone 102 but automatically routes the call to the third party device, namely the adult-aged child's phone, where the call rings. If answered, the adult-aged child will speak with the doctor's office and confirm that the call is legitimate and relates to an action item for the senior citizen. The adult-aged child may then call the senior citizen parent and indicate that they received a call from an unknown number, namely the doctor's office, and that an appointment needs scheduled. If the call is not answered by the adult-aged child, then the doctor's office may leave a voicemail from which the adult-aged child may determine that the unknown number was a legitimate called needing to be returned. The call may then be returned by the third party device (i.e., the adult-aged child) or the phone 102 (i.e., the senior citizen parent/operator).

The user may block a phone number on their contact list that is stored in memory 102*c* of phone 102 or in a memory of the interceptor device 104 if the device 104 is not an APP. The user may select to permit interceptor device 104 to transfer phone calls from blocked numbers on their contact list to phone 102 or may select to not transfer phone calls from blocked numbers to the phone 102. If the user selects to transfer phone calls from blocked numbers on the contact list to the phone, the user can also preselect to have the interceptor device 104 or the phone 102 disconnect the blocked call after allowing the phone 102 to ring a certain number of times or to automatically transfer the blocked call to voice mail. In these instances, the user will be made aware that a blocked vendor or non-vendor 14-22 has attempted to contact them. Obviously, if the incoming phone call from the blocked vendor or non-vendor phone number is not permitted to cause the call to transfer to phone 102, the user of the phone 102 will not be aware of the fact that a blocked number attempted to call them.

It will be understood that the interceptor device 104 may be programmed to function all the time or to function only at specific hours that are predetermined and specifically set by the user of phone 102. Interceptor device 104 may further be programmed to permit calls from emergency service phone numbers to be relayed to phone 102 and to cause phone 102 to ring "B".

It will further be understood that in some embodiments, the interceptor device 104 may be caused, by the user, to provide a list of phone numbers that were permitted to ring through to phone 102 and/or a list of phone numbers that were not permitted to ring through to phone 102. In other words, interceptor device 104 may store a list of all incoming calls to phone 102 and record what action was taken by the interceptor device 104 with respect to all of the incoming calls.

In summary, a first aspect of the present disclosure is directed to a system 100 for screening incoming phone calls 14*b*-22*b* comprising a phone 102 having a phone number 102*a*; an interceptor device 104 operatively engaged with the phone 102, wherein the interceptor device 104 receives all incoming phone calls 14*b*-22*b* directed to the phone number 102*a* from any one of a plurality of vendors and non-vendors 14-22; and programming provided in the interceptor device 104 that determines if a particular incoming call (any one of 14*b*-22*b*) has been made from a contact stored in a memory 102*c* of the phone 102 or in a memory of the interceptor device 104. Interceptor device 104 may have its own processor and memory if it is a physical machine that is operatively engaged with phone 102. In one embodiment, system 100 includes an interceptor device 104 is a software application (APP 104) that has been downloaded into the phone 102 by the user. The APP 104, for example, may be downloaded from an online website.

In another aspect, the present disclosure is directed to a method 200 of screening incoming phone calls 14*b*-22*b* made to a phone 102 where the method comprises providing an interceptor device 104 that is operatively engaged with phone 102; receiving, with the interceptor device 104, an incoming call (any of 14*b*-22*b*) to a phone number 102*a* associated with the phone 102; comparing 204, with programming provided in the interceptor device 104, a phone number 14*a*-22*a* associated with originating the incoming call (i.e., the associated one of the calls 14*b*-22*b*) with a stored contact phone number from a list of stored contact phone numbers. The stored contact phone numbers may be stored in the memory 102*c* of phone 102 or in a memory of the interceptor device 104 if a separate machine connected to phone 102. Method 200 further includes performing one of the steps of allowing the phone to ring 206 if the phone number 14*a*-22*a* associated with originating the incoming call 14*b*-22*b* matches a stored contact number from the list of the stored contact phone numbers; and disconnecting the incoming call 14*b*-22*b* if the phone number associated with originating the incoming call fails to match any of the stored contact phone numbers on the list of stored contact phone numbers.

The method 200 may further include the step of downloading a software application into the phone 102 where the software application then becomes the interceptor device 104. The method 200 may further include entering a list of contact phone numbers into the memory 102*c* of the phone 102 to form a list of stored contact phone numbers and then linking the contact phone number list stored in the phone 102 with the software application 104.

If the interceptor device 104 is a physical machine, the method 200 may further include physically connecting the interceptor device 104 to the phone 102 and entering a list of contact phone numbers and names into a memory of the interceptor device 104 utilizing a user interface.

Figure 6:
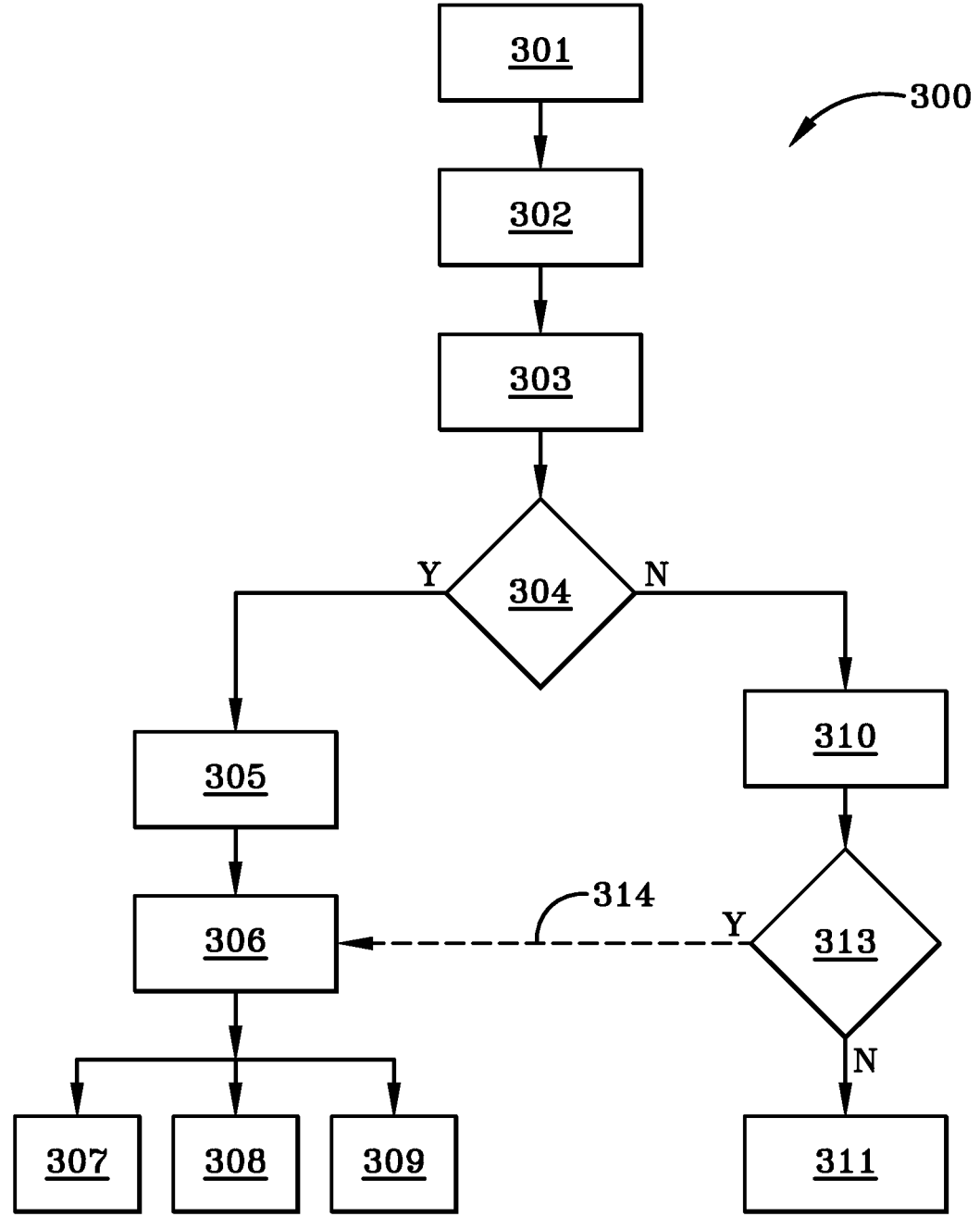
FIG. 6 is a flowchart illustrating an alternative method of using the phone system of FIG. 4.

FIG. 6 shows an alternative embodiment of a method of using the system of FIG. 4. The alternative method is indicated in FIG. 6 by the reference number 300. In a first step 301 of method 300, the interceptor device 104 (FIG. 4) is operatively engaged with the phone 102. In a second step 302, a list of contacts and associated phone numbers of those contacts is entered into the interceptor device 104 or is operatively linked with the interceptor device 104. Additionally, in this second step, contact information for one or more designated contacts are entered into the interceptor device. The one or more designated contacts are trusted individuals who are related to the individual to whom the phone 102 belongs. For example, if the phone 102 belongs to an elderly person, the designated contacts may be family members such as a son or daughter. If the phone 102 belongs to a minor, the designated contacts may be a parent. If the phone 102 belongs to a person requiring some type of care, the designated contact may be a caregiver.

If the interceptor device 104 is a physical device, the list of contacts, designated contacts, and phone numbers associated with the contacts and the designated contacts may be physically entered into the device. In another embodiment, the interceptor device 104 may include a processor and memory and may be paired with the phone 102 so that the contacts and designated contacts and their associated phone numbers stored in the memory 102*c* of the phone 102 are automatically uploaded into the memory of the interceptor device 104. If the interceptor device 104 is an APP that is downloaded to phone 102, the APP 104 is electronically connected to the database stored in the memory 102*c* of the phone 102 that includes the list of contacts, the list of designated contacts, the phone numbers for the contacts and designated contacts.

In a third step 303 of the method 300, an incoming phone call to phone 102 is routed through and/or is received by interceptor device 104. In a fourth step 304 of the method 300, the phone number associated with the incoming phone call is compared with the phone numbers of the user's contacts that were previously stored in the database, saved in the phone's memory 102*c*, or entered into the interceptor device 104. For example, if the incoming phone call originates from the phone number 16*a* (FIG. 4) associated with the second vendor 16, the programming within interceptor device 104 compares the phone number 16*a* with the list of phone numbers in the stored contact information.

FIG. 6 shows two alternative pathways after the comparison is made in fourth step 304. In a first pathway 305, a match is made between the phone number associated with the incoming call and a stored contact. For example, the phone number 16*a* is found on the list of stored contact phone numbers for approved vendors. When the match is made 305, the interceptor device 104 permits the incoming phone call to be transferred 306 through to phone 102 and the phone 102 will ring "B". Because the phone 102 rings, the user has three options available to him or her, i.e., answer the call 307, permit the call to go to voice mail 308, or decline the call 309.

FIG. 6 also shows the second pathway after the fourth step. In this second pathway 310, no match is made between the phone number associated with the incoming call and a stored contact. For example, the phone number 16*a* is not found on the list of stored contact phone numbers. If no match is made between the phone number of the incoming call and a stored phone number on the contact list the incoming phone call is routed to one of the designated contacts. This step is indicated at 313 in FIG. 6. The designated contact has the option of declining the call as at 311. The designated contact can, alternatively, accept the call by answering their phone and talking with the person or organization who made the incoming call. If, after talking to the person or organization who made the incoming call, the designated contact decides the incoming phone call should be forwarded to the owner of the phone 102, he or she may optionally enter a pre-determined code into the designated contact's phone or electronic device and forward the incoming call to interceptor 104. This is indicated by reference number 314 in FIG. 6. The interceptor 104 will receive the forwarded call and cause the user's phone 102 to ring as indicated at 306. The user of the phone 102 then has three options available to him or her, i.e., answer the call 307, permit the call to go to voice mail 308, or decline the call 309.

If the designated contact forwards the incoming call to the interceptor 104, the database of approved contacts in the interceptor 104 may be automatically updated to include the phone number of the incoming call. All other functions of the interceptor 104 are as previously described.

Interceptor device 104, or APP 104, may be embodied as a subscription-based service, or software-as-a-service, that requires a user to activate an account prior to the interceptor device's operation. When activated and embodied as a software as a service, the user may subscribe to a one-time fee or a monthly subscription fee. Upon activation, the downloaded APP 104 can begin operating in the background and screen calls in the manner described herein. The APP may accumulate a plurality of stored context from the contact list on the phone or may enable a user to directly input stored contacts into the APP 104. The APP may be embodied with various software logic that allows for adjusting or modifying contacts in one of the contact lists or the APP 104 and automatically populate or update the same contact in the other. For example, the contact list may be embodied with a button on the smartphone that runs in the background to indicate to a user whether it should be provided to the interceptor device. For example, if a user has an iPhone, they may insert a contact in the traditional known manner by uploading it to a contact list. The interceptor device or APP 104 may simply include an add-on extension that auto populates a feature into the contact list of the smartphone that enables a user to indicate the affirmance of adding the contact to a stored contact that it would wish for the interceptor device to screen. In this manner, interceptor device 104, or APP 104, allows for the allotment of a selected number of contact lists to be provided to the interceptor device. In other embodiments, every contact is provided in the APP 104.

In other embodiments described herein, when the incoming call is to be disconnected by the interceptor device 104, or APP 104, the disconnection of the incoming call may be accomplished in a number of specific ways. In one specific particular embodiment, the incoming call that has been determined to not be one of the stored contacts may be disconnected by eliminating or reducing the signal strength of the incoming call so as to purposely drop the call. In another embodiment, various filters may be used to filter the call in a way that disconnects the call so it may not cause the phone to ring. In another particular embodiment, the filter is time-based and prevents the caller from the unknown contact from calling back for a certain period of time. For example, selective filtering techniques may be utilized that disrupt the incoming signal strength only associated with that unknown phone number for a certain number of time. For example, filtering techniques may be utilized that disrupt the signal when a call originates from the unknown or unsolicited vendor for a period of one, two, three hours to as many as one, two, three days or even weeks. In this manner, providing a time-based continuum or period for selectively filtering calls can provide improved efficiency for the phone.

In another embodiment, it is possible to bypass the phone from ringing but still allow the incoming phone call to go to voicemail. When the APP 104 is initiated on the phone, the user may selectively determine whether they would like all calls to be screened and disconnected or if certain calls from certain area codes can be routed to a voicemail inbox. For example, assume that the user is in a certain area code, such as area code (330). There may be instances in which a user does not have a certain phone number, such as their doctor's office or their utility provider, stored in their phone; however, they are local and would originate from the same area code. In this instance, the user can select the APP 104 to route all calls originating from a (330) area code directly to a voicemail inbox while selectively disconnecting all incoming calls not originating from a (330) area code. This would allow a user to selectively receive voicemails from a known area code while disconnecting and blocking/screening all other calls from foreign or non-local locations. This provides a unique advantage inasmuch as important information, such as local doctor's office, would be able to leave a voicemail, but an unknown vendor from a remote location would be immediately disconnected. These features described herein enable selective channeling and routing of unknown numbers based on a known criteria, such as the incoming area code.

In another embodiment, when the application is running in the background and automatically screening calls on the mobile smartphone when embodied as APP 104, the APP 104 may document the incoming calls to allow a user to selectively view, if so desired, all calls that were screened and disconnected. This would allow a user to determine whether they would like to return the phone call at their leisure if they later determine that the call was screened and disconnected but was of actual importance to the user.

In this instance, selectively determining a call may be utilized through a method of localizing the incoming call to determine its origination point. If sufficiently localized to a known region, such as limited by area code, then the call may be allowed to proceed to a voicemail inbox as detailed above.

In another embodiment, the manner in which the call is disconnected may be accomplished by modulating or demodulating the incoming signal in a manner to disrupt it in a sufficient way to effectively block the call. The modulation techniques utilized could be accomplished in a digital manner by disconnecting the radio frequency signals of the incoming call. The demodulation in one particular embodiment may utilize a passband modulation technique or a bandpass filtered signal technique. The passband modulation technique may occur actively in the background without user input to disconnect the call. This effectively minimizes any drain on the battery life of the cell phone thereby improving overall efficiency while simultaneously accomplishing the goal of screening the call to prevent the user from receiving a plurality of unknown or unsolicited or unwanted phone calls. Additionally, multiplexing techniques may be implemented to combine digital and analog signals are combined over the spectrum and the signal be filtered.

Further it is to be understood that the designated contact need not be an adult-aged child of the recipient of the incoming phone call, such as a senior citizen. The designated contact could be any individual, related or not, that is responsible and able to discern the validity of the incoming call to determine whether it is a scam. For example, the intended recipient of the phone call may be a young child having possession of a cell phone. In this instance, the designated recipient may be the child's parent. This scenario would ensure that the child, as the intended recipient of the call, does not receive unwanted spam or marketing call. However, the same holds true for bullying. The parent can receive the incoming phone call from an unknown number, having been directed by the interceptor device, on the child's phone. The parent is typically more responsible than the child and may make the determination of whether the incoming call is sourced from a bully or whether the phone number is legitimate and a fried of the child.

Further, the present disclosure also applies to text messages, SMS messages, messages within mobile applicants (i.e., Facebook Messenger or iMessage), or the like. Thus, when the term "phone call" is used herein, it equally applies any form of electronic communication including these types of text messaging services/techniques, amongst other types of electronic communications. For example, if the intended recipient of the text message receives a text or an in-application message from an unknown contact, then the message may be directed to the designated contact, such as a parent of the child receiving the message. The parent may then "screen" the message to determine whether the message is legitimate. If legitimate, then the parent, as the designated contact, may enable the message to be delivered to the intended recipient. The parent may also determine whether the message is a form of bullying. If the message is a form of bullying, the parent can deny the transmission of the message. The parent will then know the source of the bullying message to alert proper authority or entity or individual to report the abusive conduct.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

The term "logic", as may be used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments,"

"one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A method of screening and routing incoming text messages to a phone comprising:

providing an interceptor device that is operatively engaged with a phone;

storing a phone number of a designated contact in the interceptor device; and receiving, with the interceptor device, an incoming text message to a phone number associated with the phone;

comparing, with programming provided in the interceptor device, a phone number that originated the incoming text message with a list of stored contact phone numbers; and performing one of:

(i) allowing the phone to alert the user if the phone number that originated the incoming text message matches a stored contact phone number from the list of stored contact phone numbers; and (ii) blocking the incoming text message if the phone number that originated the incoming text message fails to match any stored contact phone number from the list of the stored contact phone numbers, and forwarding the incoming text message to a third party device of a designated contact if the phone number that originated the text message fails to match any phone number of the list of stored contact phone numbers in the phone; and wherein the interceptor device comprises software executing on the phone and using automatic background processing such that the forwarding to the third party device is performed automatically and without user intervention, and wherein the designated contact is enabled to screen the incoming text message and, upon determining the message is legitimate, forward the incoming text message back to the phone by entering a passcode at the third party device, thereby causing the interceptor device to permit delivery of the incoming text message and to update the list of stored contact phone numbers to include the phone number that originated the incoming text message.

2. The method of claim 1, further comprising:

effecting the passcode to be entered at the third party device by the designated contact that effectuates routing the incoming text message to the phone that originally received the incoming text message.

3. The method of claim 1, further comprising:

downloading a software application onto the phone, wherein the interceptor device is the software application;

entering a plurality of contact phone numbers in the phone to form the list of stored contact phone numbers; and linking the list of stored contact phone numbers with the software application.

4. The method of claim 1, wherein if (ii) is performed, then the designated contact:

receives the incoming text message; and screens the incoming text message.

5. The method of claim 1, wherein if (ii) is performed, then the designated contact:

receives the incoming text message; and forwards or routes the incoming text message back to the phone that then alerts the user.

6. The method of claim 5, further comprising:

entering and saving the phone number associated with the incoming text message into the stored list of contact phone numbers on the phone after a determination by the designated contact that a source of the incoming text message is not a threat.

7. The method of claim 1, wherein if (ii) is performed, then the designated contact:

receives the incoming text message; and denies transmission of the incoming text message back to the interceptor device if the incoming text message is determined to be a form of bullying.

8. The method of claim 1, further comprising:

activating the interceptor device as a mobile application on the phone;

effecting a user to subscribe to a software-as-a-service associated with the interceptor device; and effecting the user to aggregate a plurality of contacts into one of (i) a database in the mobile application or (ii) a contact list in the phone.

9. The method of claim 1, wherein blocking the incoming text message is accomplished by disrupting signal strength of the incoming text message through passband modulation.

10. The method of claim 1, further comprising:

immediately and momentarily disrupting a transmission signal of the phone to disconnect the incoming text message after determination that the incoming text message is not from a stored contact to cause an unsolicited sender to believe that the phone number of the phone is inoperable and thereby stop additional text messages in the future; and initiating a time-based filter to prevent the unsolicited sender from messaging the user for a set period of time.

11. The method of claim 1, further comprising:

when the phone number that originated the incoming text message is associated with a predetermined area code, routing the incoming text message to a designated message inbox while preventing the phone from alerting the user; and forwarding to the third party device all other incoming text messages originating from phone numbers that fail to match the predetermined area code and are absent from the stored contact list.

12. The method of claim 1, wherein the interceptor device is programmed to permit delivery of incoming text messages from emergency service phone numbers to the phone regardless of whether such phone numbers are present in the stored contact list.

13. The method of claim 1, further comprising:

suppressing user notifications on the phone for an incoming text message that fails to match any stored contact phone number while the incoming text message is forwarded to the third party device for screening; and generating a user notification only upon approval by the designated contact.

14. The method of claim 1, further comprising:

recording, in the interceptor device, each incoming text message's originating phone number together with an indication of whether the message was allowed, blocked, or forwarded, and making the log available for display on the phone.

15. The method of claim 1, wherein the interceptor device is configured to apply user-configurable criteria comprising at least one of (i) an area code associated with the originating phone number and (ii) message content to determine whether to allow, block, or forward the incoming text message.

16. The method of claim 1, further comprising:

synchronizing, by the interceptor device, modifications to contact entries between a contact list maintained by the interceptor device and a native contacts list maintained by the phone.

17. The method of claim 1, further comprising:

upon user command, providing on the phone information identifying (i) phone numbers from which incoming text messages were permitted to alert the user and (ii) phone numbers from which incoming text messages were blocked or forwarded.

18. The method of claim 1, wherein the interceptor device is configured, responsive to a user selection, to block and forward all incoming text messages originating from phone numbers absent from the stored contact list except for messages originating from numbers associated with a userspecified set of area codes that are routed to the designated message inbox without alerting the user.

19. A system for screening and routing incoming phone calls comprising:

a phone having a phone number;

an interceptor device operatively engaged with the phone, wherein the interceptor device receives incoming phone calls directed to the phone number; and programming provided in the interceptor device that uses automatic background processing to operate on the phone to prevent the user from needing to open a second screening application as the interceptor device receives incoming phone calls; and a passcode entered at a third party device by a designated third party contact that effectuates routing a particular incoming call back to the phone that originally received the particular incoming call;

wherein, upon receiving the particular incoming call from a phone number not present in a stored contact list, the interceptor device automatically and without user intervention routes the incoming call to the third party device for screening, and wherein, upon the designated contact entering the passcode, the interceptor device receives a forwarded call from the third party device, causes the phone to ring within the same call session.

20. A method of screening and routing incoming phone calls to a phone, comprising:

receiving, with an interceptor device operatively engaged with the phone, an incoming call directed to a phone number associated with the phone;

comparing, with programming provided in the interceptor device, a phone number associated with the incoming call to a stored contact list;

in response to determining that the phone number is not present in the stored contact list, automatically and without user intervention routing the incoming call from the interceptor device to a third party device of a designated contact for human screening while the call is active, the interceptor device executing on the phone via automatic background processing; and in response to the designated contact entering a passcode at the third party device, forwarding the incoming call back to the interceptor device and causing the phone to ring for connection to the caller during the same call session, and updating, by the interceptor device, the stored contact list to include the phone number associated with the incoming call.

* * * * *